(12) United States Patent
Luyendijk et al.

(10) Patent No.: US 8,919,732 B2
(45) Date of Patent: Dec. 30, 2014

(54) EXTENDABLE PRESSURIZED FLUID COUPLER

(75) Inventors: Joost Luyendijk, Rosmalen (NL); Edward Amelsfoort, Tilburg (NL)

(73) Assignee: Caterpillar Work Tools B.V., S-Hertogenbosch (NL)

(*) Notice: Subject to any disclaimer, the term of this patent is extended or adjusted under 35 U.S.C. 154(b) by 642 days.

(21) Appl. No.: 13/131,367

(22) PCT Filed: Nov. 27, 2008

(86) PCT No.: PCT/NL2008/050755
§ 371 (c)(1),
(2), (4) Date: Jul. 6, 2011

(87) PCT Pub. No.: WO2010/062165
PCT Pub. Date: Jun. 3, 2010

(65) Prior Publication Data
US 2011/0259441 A1    Oct. 27, 2011

(51) Int. Cl.
*F16L 37/52*    (2006.01)
*F16L 37/62*    (2006.01)
*F16L 37/32*    (2006.01)
*E02F 9/22*    (2006.01)

(52) U.S. Cl.
CPC ............... *F16L 37/52* (2013.01); *F16L 37/62* (2013.01); *E02F 9/2275* (2013.01)
USPC ................ 251/149.1; 137/614.03; 285/9.2; 285/306

(58) Field of Classification Search
CPC ........... F16L 37/52; F16L 37/62; F16L 37/30; F16L 37/32; F16L 37/38
USPC ......... 137/614.03–614.05, 614, 1; 251/149.1; 285/9.2, 148.21, 148.2, 148.4, 305, 285/306
See application file for complete search history.

(56) References Cited

U.S. PATENT DOCUMENTS

| | | | | |
|---|---|---|---|---|
| 3,035,609 | A * | 5/1962 | Dyer | 137/506 |
| 5,462,084 | A * | 10/1995 | Arisato | 137/614.03 |
| 6,230,740 | B1 * | 5/2001 | Horton et al. | 137/614 |
| 6,719,270 | B2 * | 4/2004 | Ozawa | 251/149 |
| 8,210,204 | B2 * | 7/2012 | Hasunuma | 137/614.04 |

FOREIGN PATENT DOCUMENTS

| | | |
|---|---|---|
| BE | 387874 | 5/1932 |
| EP | 1566490 | 2/2004 |
| FR | 2854415 | 4/2003 |
| FR | 2886372 | 5/2005 |
| GB | 2167508 | 5/1986 |
| WO | 2007/066797 | 12/2006 |

\* cited by examiner

*Primary Examiner* — Kevin Lee
(74) *Attorney, Agent, or Firm* — Baker Hostetler

(57) ABSTRACT

An extendable pressurized fluid coupler is disclosed. The extendable pressurized fluid coupler has a guiding portion having a central fluid channel. The extendable pressurized fluid coupler further has a piston having a central fluid channel, the guiding portion and the piston having a common central axis. The extendable pressurized fluid coupler also has a drive circuit for driving the piston. The piston is extendable with respect to the guiding portion. The guiding portion is arranged for guiding the piston along the central axis. The piston is arranged for connecting the pressurized fluid coupler to a corresponding coupler having a second fluid channel, so that a fluid passage for a main pressurized fluid circuit is established.

13 Claims, 4 Drawing Sheets

EXTENDABLE PRESSURIZED FLUID COUPLER

RELATION TO OTHER PATENT APPLICATION

This application is the U.S. National Phase of PCT/NL2008/050755 filed Nov. 27, 2008, with the same title.

TECHNICAL FIELD

The present disclosure is directed to a pressurized fluid coupler, more particular to an extendable pressurized fluid coupler.

BACKGROUND

Quick couplers are known for connecting fluid channels, particularly in high pressure hydraulic circuits. During connection of the fluid channels, spillage of fluid may occur. In high pressure circuits, a leak in a pressurized fluid circuit may cause the fluid to spray out, causing the pressure in the circuit to drop. Therefore, the coupling of the fluid channels must be reliable and fluid tight. The ends of two connectable hydraulic hoses are oftentimes provided with dry-break valves. These dry-break valves only open when they are connected in a locked manner. Only after locking the dry-break valves, the valves open and a fluid passage can be established through the valves so that the fluid may circulate through the circuit.

In some present quick coupler assemblies, when connecting the couplers, a part of the hoses is moved with the couplers. Because such couplings oftentimes have to be established in confined spaces, the bending radius requirements of the hoses can oftentimes not be satisfied. During movement of a coupler to couple the hydraulic circuit of a work tool and a machine, the hydraulic hoses may become wedged, caught, or trapped in or between and/or be damaged by the structure of the machine and/or the work tool. This may lead to premature hose failures, causing major spillage of the fluid and significant downtime.

A known coupler assembly for a pressurized hydraulic circuit is disclosed in German utility model publication DE 20 2004 004 144. The coupler assembly has a receiving coupler and an extendable coupler. The extendable portion comprises a hydraulic actuator. A fluid channel extends centrally through the piston part of the actuator, which piston is connected to a hydraulic hose that is in connection with the fluid channel of the piston. On the opposite side, the receiving portion is in fluid connection with another hydraulic hose. In an extended position of the piston, the piston is connected to the receiving portion, and the fluid channel in the piston provides for a fluid passage between the hydraulic hoses. With this coupler assembly a relatively high risk of hose failure and/or downtime is present, because of the repetitive moving and curving of the hose that is connected to the piston part. Also, extra space is needed for the hoses to move.

SUMMARY OF THE INVENTION

In one aspect, the present disclosure is directed to an extendable pressurized fluid coupler. The extendable pressurized fluid coupler includes a guiding portion having a central fluid channel. The extendable pressurized fluid coupler further includes a piston having a central fluid channel. The guiding portion and the piston have a common central axis. The extendable pressurized fluid coupler also includes a drive circuit for driving the piston. The piston is extendable with respect to the guiding portion. The guiding portion is arranged for guiding the piston along the central axis. The piston is arranged for connecting the pressurized fluid coupler to a corresponding coupler having a second fluid channel, so that a fluid passage for a main pressurized fluid circuit is established.

In another aspect, the present disclosure is directed to a receiving pressurized fluid coupler for connection with an incoming pressurized fluid coupler. The receiving pressurized fluid coupler includes a first portion having a central axis. The receiving pressurized fluid coupler further includes a receiving portion for receiving an incoming pressurized fluid coupler for establishing a fluid passage between the two couplers, the receiving portion having a central axis that is parallel to the central axis of the first portion. The receiving pressurized fluid coupler includes a fluid channel that extends centrally through the first portion and the receiving portion. The receiving portion is arranged to move with respect to the first portion in a direction that is perpendicular to the central axes, for alignment with the incoming pressurized fluid coupler.

In yet another aspect, the present disclosure is directed to a method of coupling two fluid circuit channels for establishing a fluid passage between the channels. The method includes a first fluid channel extending through a guiding portion and a piston. The first fluid channel is connected to a first fluid circuit channel. The method also includes a second fluid channel that extends through a receiving pressurized fluid coupler. The second fluid channel is connected to a second fluid circuit channel. The method further includes that the piston is driven away from the first fluid circuit channel, in the direction of the receiving pressurized fluid coupler. The method also includes that the piston connects to the receiving pressurized fluid coupler so that a fluid passage between the first and second fluid circuit channels is established.

DETAILED DESCRIPTION

Figure 1:
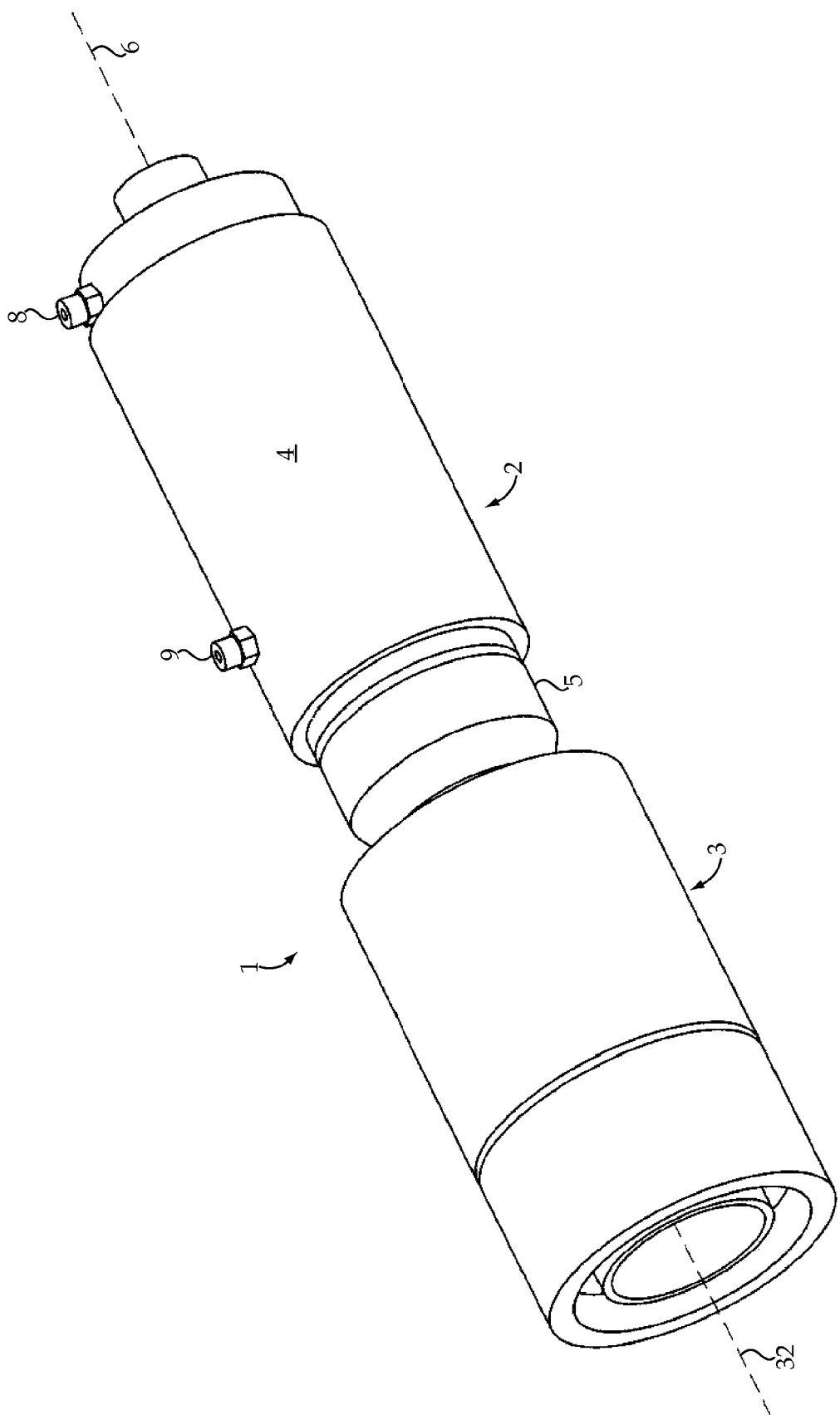
FIG. 1 is a perspective view of an extendable pressurized fluid coupler and a receiving pressurized fluid coupler.

FIG. 1 illustrates an exemplary assembly 1 of an extendable pressurized fluid coupler 2 and a receiving pressurized fluid coupler 3. The couplers 2, 3 may be suitable for connecting two ends of pressurized fluid circuit channels of a main pressurized fluid circuit to establish a circulating fluid circuit. The fluid circuit may comprise multiple coupler assemblies 1. In an embodiment, the main pressurized fluid circuit channels may comprise hoses. The couplers 2, 3 may be cylindrically shaped.

The extendable pressurized fluid coupler 2 may comprise a guiding portion 4 and a piston 5. Both portions 4, 5 may be cylindrically shaped. The guiding portion 4 and the piston 5 may have a common central axis 6. The guiding portion 4 may be arranged for guiding the piston 5 along the central axis 6. The piston 5 may be extendable with respect to the guiding portion 4. A drive circuit 7 may be provided for driving the piston 5 to and away from the guiding portion 4. The drive circuit 7 may comprise a pressurized fluid drive circuit 7 such as an hydraulic circuit. The extendable pressurized fluid coupler 2 may further comprise a drive circuit for driving the piston 5. For connection to a hydraulic drive circuit pump, first and second drive circuit connectors 8, 9, respectively, may be provided. In an embodiment, the drive circuit 7 may be a pneumatic drive circuit. Alternatively, the drive circuit 7 may be arranged to drive the piston 5 with the aid of a rotational or linear electromotor.

The extendable pressurized fluid coupler 2 may comprise a first fluid channel 10. The receiving pressurized fluid coupler 3 may comprise a second fluid channel 11. The extendable pressurized fluid coupler 2 may be arranged to be connected to the receiving pressurized fluid coupler 3 for establishing a fluid passage between both couplers 2, 3. After connection, the main pressurized fluid circuit may extend through both couplers 2, 3 so that pressurized fluid may run from the first fluid channel 10 to the second fluid channel 11 and/or vice versa. In an embodiment, the extendable pressurized fluid coupler 2 may be connected to any type of corresponding coupler for establishing a fluid passage between the extendable pressurized fluid coupler 2 and the respective corresponding coupler.

Figure 2:
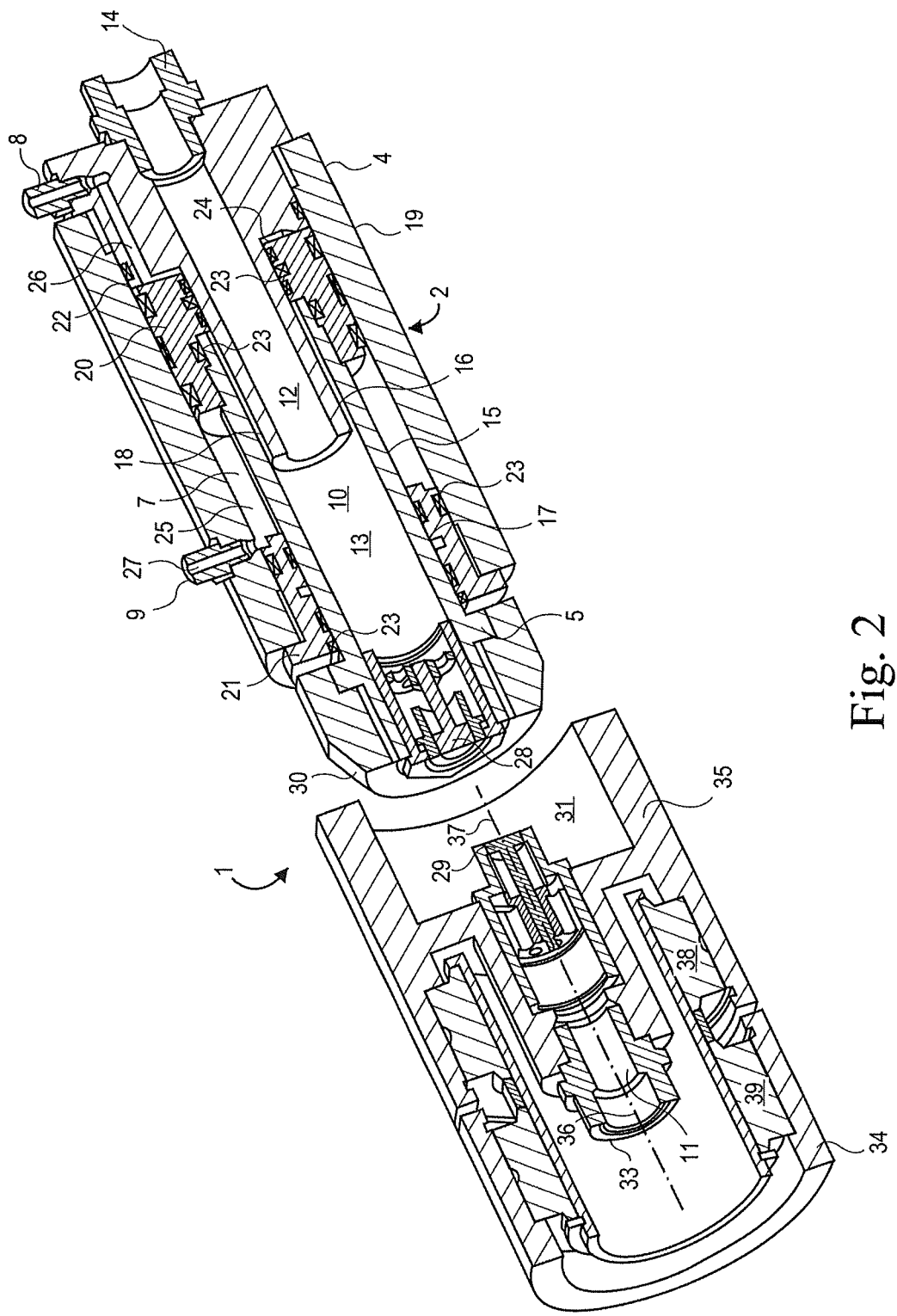
FIG. 2 is a cross sectional view in perspective of the extendable pressurized fluid coupler and receiving pressurized fluid coupler of FIG. 1.

FIG. 2 illustrates a cross sectional view of the assembly 1 shown in FIG. 1. As shown, the first fluid channel 10 may be provided with a guide fluid channel 12 and a piston fluid channel 13. As shown in FIG. 2, the guiding portion 4 may be provided with a fluid channel 12, which may be referred to as the guide fluid channel 12, while the piston 5 may also be provided with a fluid channel 13, which may be referred to as the piston fluid channel 13. The guide fluid channel 12 and the piston fluid channel 13 may together form the first fluid channel 10 extending through the extendable pressurized fluid coupler 2. The guiding portion 4 may be provided with a connection element 14 for connection of the guide fluid channel 12 to a pressurized fluid circuit channel (not shown). In an exemplary embodiment, the pressurized fluid circuit channel may comprise a flexible fluid hose that is provided on or in a frame. The fluid channels 12, 13 may guide the pressurized fluid from the hose to the receiving pressurized fluid coupler 3, or from the receiving pressurized fluid coupler 3 to the hose.

The piston 5 is guided by the guiding portion 4. The piston 5 may comprise a first piston guide surface 15. The first piston guide surface 15 may be formed by the piston fluid channel 13. For example, an inside surface of the piston fluid channel 13 may form the piston guide surface 15. The guiding portion 4 may be provided with a second piston guide surface 16 for guiding the piston 5 along its first piston guide surface 15. The second piston guide surface 16 may be formed by an outer surface of the guide fluid channel 12. The inner surface of the piston fluid channel 13 may be guided along, and moved with respect to, an outer surface of the guide fluid channel 12. In another embodiment, an outer surface 17 of the piston fluid channel 13 may be guided along an inner surface 18 of the guide fluid channel 12.

The guiding portion 4 may comprise a mount portion 19. The mount portion 19 may comprise a tube. Bearings 20, 21 for guiding the piston 5 may be mounted on the mount portion 19. Two bearings 20, 21 may be provided for guiding the piston 5 along the guiding portion 4. The bearings 20, 21 may be arranged between an outer surface of the piston 5 and an inner surface of the guiding portion 4. In an embodiment, the bearings 20, 21 may be arranged between the outer surface 17 of the piston fluid channel 13 and an inner surface 22 of the mount portion 19. A first bearing 20 may be coupled to the piston 5 so that it may run along the guiding portion 4. The first bearing 20 may be fixed to the piston fluid channel 13. The first bearing 20 may be arranged to move with respect to the guiding portion 4. The first bearing 20 may also move along the guide fluid channel 12. A second bearing 21 may be fixed to the guiding portion 4 and may be arranged to guide the piston 5 so that the piston 5 may move with respect to the guiding portion 4 and the second bearing 21. The bearings 20, 21 may have sealing properties to prevent passing of pressurized fluid that is present in the pressurized fluid channels 12, 13 and/or in the drive circuit 7. The bearings 20, 21 may be equipped with seal rings 23 to prevent such passing of fluid.

The extendable pressurized fluid coupler 2 may comprises a drive circuit 7 for driving the piston 5 to and from the guiding portion 4. The drive circuit 7 may be a second pressurized fluid circuit that may be separate from the main pressurized fluid circuit that runs through the couplers 2, 3. The drive circuit 7 may be arranged to drive the piston 5 for connection with the corresponding receiving pressurized fluid coupler 3. The drive circuit 7 may be arranged to drive the fluid at a relatively low pressure, as compared to the main pressurized fluid circuit. The drive circuit 7 may be arranged to drive the fluid at speeds of between approximately 3 and 50 liters per minute, or between approximately 7 to 30 liters per minute, for example between approximately 10 and 15 liters per minute. The pressure and/or speed of the drive circuit 7 may be similar to the pressure and/or speed that is applied in common type hydraulic actuators. In contrast, the main pressurized fluid circuit may be arranged to drive the fluid at relatively high pressure and speed, for example at at least approximately 150 liters per hour, or at least approximately 250 liters per hour, for example approximately 300 liters per hour. The pressurized fluid circuits may comprise hydraulic circuits.

The drive circuit 7 may comprise fluid rooms 24, 25, on both sides of the first bearing 20, so that the piston 5 may be driven in two opposite directions along the central axis 6 by pumping fluid into one of the rooms 24, 25, while pumping fluid out of another one of the rooms 24, 25. A first room 24 may be provided between the guide fluid channel 12 and the mount portion 19, on one side of the first bearing 20. A first drive circuit channel 26 may extend between the first drive circuit connector 8 and the first room 24. The extendable pressurized fluid coupler 2 may be arranged so that pumping fluid into the first room 24 results in enlargement of the first room 24 by the added fluid, so that the piston 5 may be driven away from the guiding portion 4. A second room 25 may be provided between the piston fluid channel 13 and the mount portion 19, on the other side of the first bearing 20. A second drive circuit channel 27 may extend between the second drive circuit connector 9 and the second room 25. The extendable pressurized fluid coupler 2 may be arranged so that pumping fluid into the second room 25 may result in enlargement of the second room 25 by the added fluid, so that the piston 5 may be driven in the direction of the guiding portion 4.

At the distal end 10 of the piston 5 a piston valve 28 may be provided that may close off the piston fluid channel 9 when it is not connected to the receiving pressurized fluid coupler 3, to prevent spilling of fluid. The piston valve 28 may be connectable to a corresponding receiving valve 29 of the receiving pressurized fluid coupler 3. The piston valve 28 may comprise a male or female element for cooperation with a female or male element, respectively, of the corresponding receiving valve 29, so that a fluid tight connection between the first and second fluid channels 10, 11 is established. The valves 28, 29 may comprise dry-break valves. The valves 28, 29 may be arranged to prevent spillage of fluid during connection of the extendable and receiving pressurized fluid coupler 2, 3 at relatively high pressures of the fluid in the main pressurized fluid circuit.

The piston 5 may have a tapered end 30 for alignment with the corresponding receiving pressurized fluid coupler 3. The tapered end 30 may be arranged to guide and align the piston 5 with respect to a receiving opening 31 of the receiving pressurized fluid coupler 3, so that the valve 28 of the piston 5 is connected with the corresponding valve 29 of the corresponding receiving pressurized fluid coupler 3.

The receiving pressurized fluid coupler 3 may have a second fluid channel 11 having a central axis 32. At the end of the second fluid channel 11, the receiving valve 29 may be provided for fluid tight coupling of the first and second fluid channel 10, 11 in cooperation with the corresponding piston valve 28. The receiving valve 29 may prevent spilling of pressurized fluid and may be a dry break valve.

Opposite the receiving valve 28, the receiving pressurized fluid coupler 3 may comprise a connection element 33 to connect the second fluid channel 11 with a fluid circuit channel. In an embodiment, this fluid circuit channel may be arranged on or in a frame. In a further embodiment, the fluid circuit channel may comprise a pressurized fluid hoses.

The receiving pressurized fluid coupler 3 may comprise a first portion 34 and a second portion 35. The first portion 34 may in use be mounted onto a frame. The first portion 34 may have a central axis 36. The second portion 35 may be referred to as a receiving portion 35. The receiving portion 35 may be provided with the receiving opening 31 for receiving the piston 5. The receiving opening 31 may be arranged to guide and/or partly enclose a head of the piston 5 during connection. The receiving portion 35 may have a central axis 37. The receiving portion 35 may further be provided with the receiving valve 29 and the second fluid channel 11. The second fluid channel 11 extends approximately along the central axis 32 of the receiving pressurized fluid coupler 3, through the first and the receiving portion 34, 35.

The receiving portion 35 may be arranged to move with respect to the first portion 34 in a direction that is perpendicular to the central axes 36, 37, i.e. in a transverse direction, for alignment with the incoming piston 5. The receiving pressurized fluid coupler 3 may be arranged so that the axes 36, 37 of the first and the receiving portion 35, respectively, may remain parallel. The first portion 34 may be arranged to rotate with respect to the second fluid channel 11, so that the central axis 36 of the first portion 34 may be tilted with respect to the central axis 32 of the second fluid channel 11. Similarly, the receiving portion 35 may be arranged to rotate with respect to the second fluid channel 11. These rotations may allow the first and the receiving portion 34, 35 to move with respect to each other in a transverse direction. The first portion 34 and the receiving portion 35 may be provided with spherical bearings 38, 39, respectively. The spherical bearings 38, 39 may be connected to each other by a stiff part. As shown, the stiff part may be the second fluid channel 11. Instead of, or next to, spherical bearings 38, 39, resilient bearings, such as rubber bearings, may be provided. Also other constructions may allow the receiving portion 35 to move in a direction perpendicular to its central axis 37 for allowing alignment with the piston 5.

A resilient element, such as a spring or cupped spring washer or the like, may be provided at the end of the first portion 34, to absorb forces when connecting of the piston 5 with the receiving portion 35. The resilient element may be biased in a direction parallel to or in line with the central axis 36 of the first portion 34.

The receiving pressurized fluid coupler 3 may be arranged to receive any type of incoming pressurized fluid coupler that corresponds to the receiving pressurized fluid coupler 3, so that the second fluid channel 11 may be connected with a fluid channel that is provided in the incoming pressurized fluid coupler and a fluid passage between the two couplers may be established.

Figure 3:
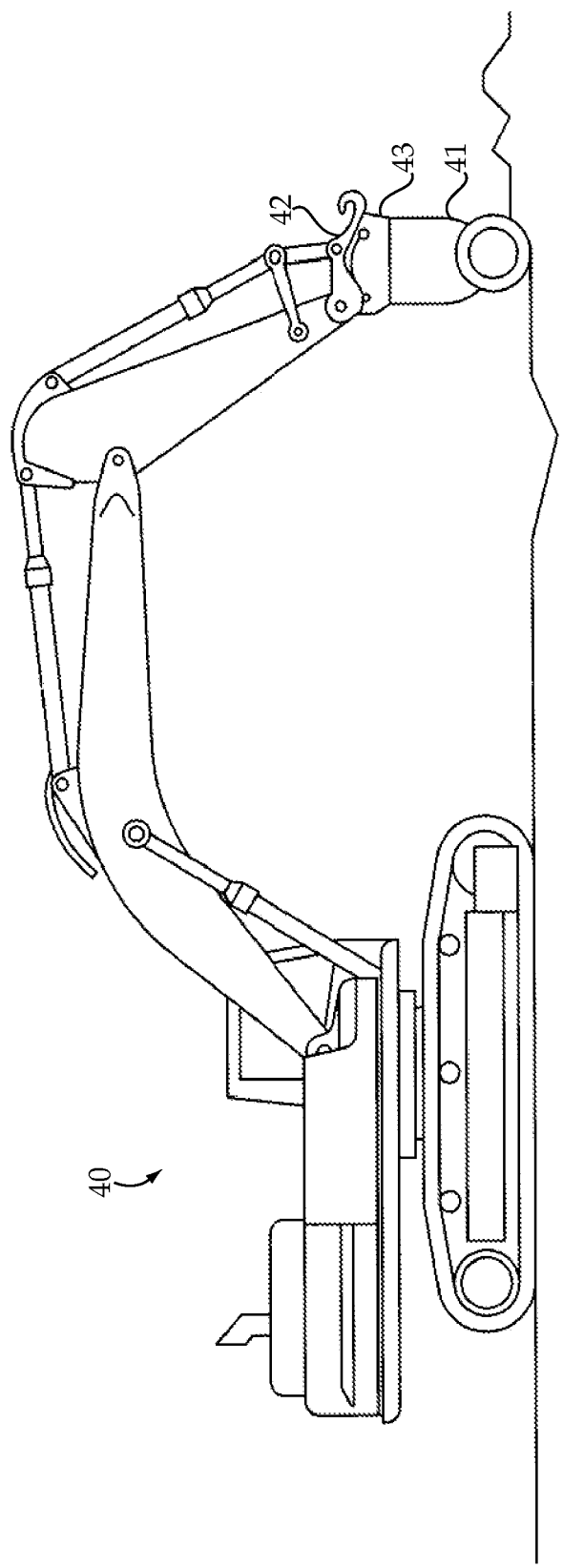
FIG. 3 is a side view of a machine and a work tool provided with an extendable pressurized fluid coupler and a receiving pressurized fluid coupler.
Figure 4:
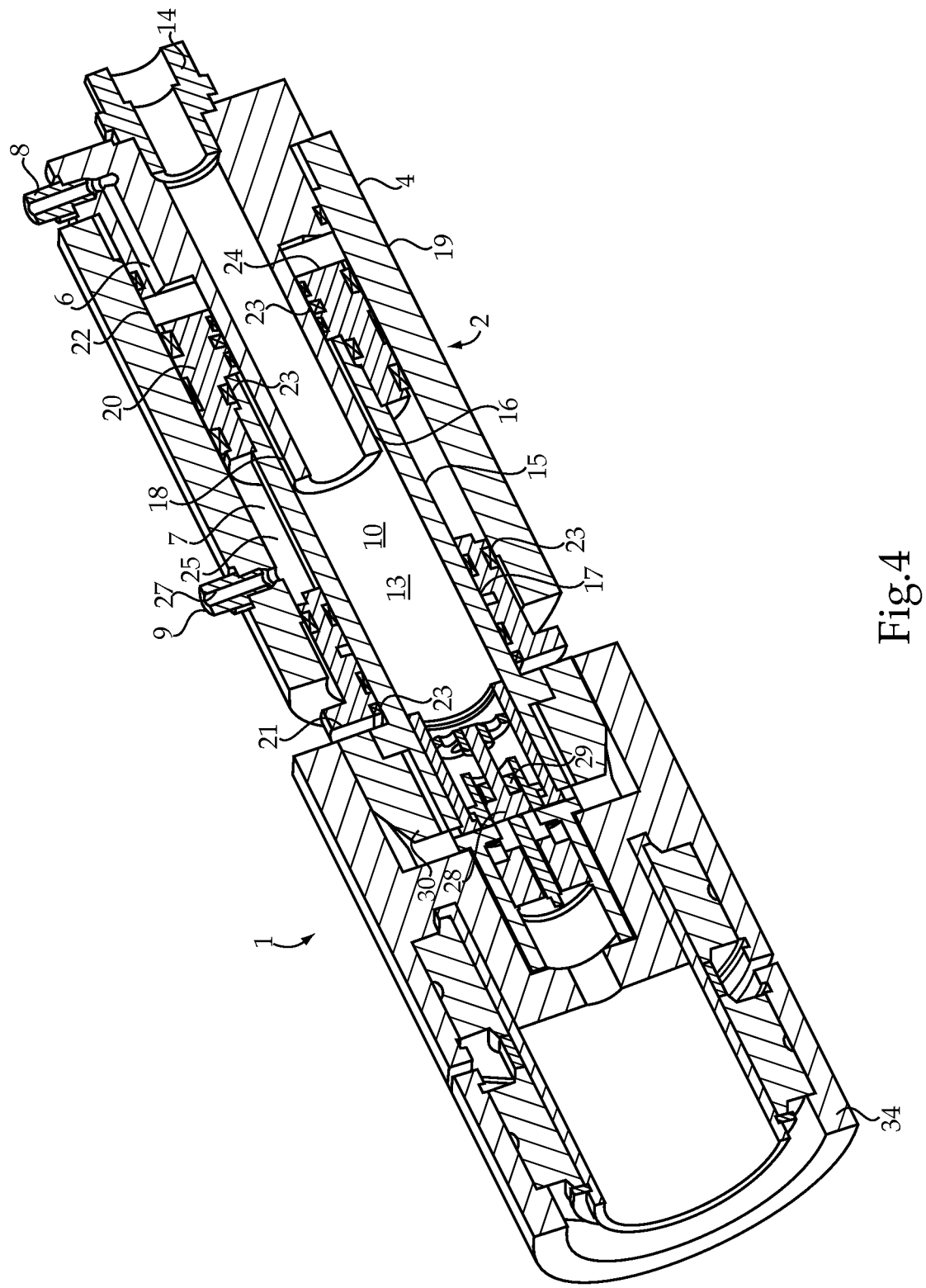
FIG. 4 is a cross sectional view of the extendable pressurized fluid coupler coupled with the receiving pressurized fluid coupler according to the present disclosure.

In FIG. 3 an exemplary embodiment is shown of a machine 40 and a work tool 41 that may comprise a coupler assembly 1 as described above. The machine 40 may be equipped with a main pressurized fluid circuit for driving the boom and/or stick and/or work tool 41. The main pressurized fluid circuit may be a hydraulic circuit having a fluid speed of more than 150 liters per minute. The machine 40 and the work tool 41 may each be equipped with a coupling frame 42, 43, respectively, for coupling the work tool 41 to the machine 40. The work tool 41, or at least a part thereof, may be driven by the main pressurized fluid circuit that is present in the machine 40. In an embodiment, the machine 40 may be an excavator, tractor, bulldozer, or the like. In a further embodiment, the work tool 41 may comprise a cutter, auger, bucket, blade, broom, cutter, cold planer, compactor, delimber, fork, grapple, hammer, hopper, mulcher, multi-processor, pulverizer, rake, ripper, saw, scarifier, shear, plow, grinder, thumb, tiller, trencher, truss boom, or the like. A connection may be established between the pressurized fluid circuit channels of the machine 40 and those present in the work tool 41 by the coupler assembly 1. The extendable pressurized fluid coupler 2 may be provided in, on or near the machine coupler part 42, and the receiving pressurized fluid coupler 3 may be provided in, on or near the work tool coupler part 43. The couplers 2, 3 may be arranged on the machine 40 and on the work tool 41, respectively, so that they may connect to each other. The piston 5 of the extendable pressurized fluid coupler 2 mounted on the machine 40, may connect to the receiving pressurized fluid coupler 3 mounted on the work tool 41. In an alternative embodiment, the extendable pressurized fluid coupler 2 may be provided onto the work tool 41 and the receiving pressurized fluid coupler 3 may be provided onto the machine 40.

INDUSTRIAL APPLICABILITY

The extendable and the receiving pressurized fluid couplers 2, 3 may be applied for establishing a fluid tight connection between pressurized fluid circuit channels, such as channels of high pressure hydraulic circuits that have fluid speeds of at least approximately 150, or at least approximately 250 liters per minute. Both the extendable and the receiving pressurized fluid coupler 2, 3 may have a static part that may be mounted onto a frame, and a moving part that may move with respect to the static part. A fluid channel may extend through both parts. The static part may be connected to a pressurized fluid circuit channel, for example a flexible hose or any type of fluid circuit channel. The moving parts may be moved to be connected to each other, while the static parts may remain static. Such couplers 2, 3 may allow for connection between pressurized fluid circuit channel ends in relatively small spaces, without having to move the respective fluid circuit channels. During such connection, hoses or other fluid circuit channels that are connected to the static parts of the couplers 2, 3 may remain in place, so that possible damaging of the fluid circuit channels may be prevented.

In a method of coupling two pressurized fluid couplers 2, 3 a fluid passage between two pressurized fluid circuit channels may be established. Each of the first and second fluid channels 10, 11 of the couplers 2, 3, respectively, may be part of, or connected to, a further fluid circuit channel so that the fluid circuit channels may be connected. One of the couplers 2, 3 may comprise an extendable fluid coupler 2. Another one of the couplers 2, 3 may comprise a receiving pressurized fluid coupler 3. The extendable fluid coupler 2 may connect to the receiving pressurized fluid coupler 3. Before connection, the central axis 6 of the extendable pressurized fluid coupler 2 may be brought approximately in line with the central axis 32 of the receiving pressurized fluid coupler 3. To connect the fluid channels 10, 11, the piston 5 of the extendable pressurized fluid coupler 2 may move away from the respective first fluid circuit channel 10, in the direction of the receiving pressurized fluid coupler 3, so that the first fluid channel 10 may be extended. The piston 5 may connect to the receiving pressurized fluid coupler 3 so that a fluid passage between the first and second fluid channels 10, 11, and the respective fluid circuit channels may be established, while the fluid circuit channels remain in place.

When the piston 5 is extended, the inside surface of the piston fluid channel 13 may be guided along the outside surface of the guide fluid channel 12, so that the piston 5 may comprise the relatively wide channel 13. The relatively narrow channel 12 may remain static with respect to the frame to which it is mounted.

Pressurized fluid may be present in the fluid channels 10, 11 in the respective couplers 2, 3 and in the fluid circuit channels of the remaining parts of the main pressurized fluid circuit. In a disconnected condition, the fluid may be prevented from flowing out of the respective couplers 2, 3 by the respective closed valves 28, 29. When the piston 5 extends and connects to the receiving pressurized fluid coupler 3 the valves 28, 29 may open so that pressurized fluid may flow from one coupler 2 or 3 to another coupler 2 or 3 along the central axes thereof. The pressurized fluid that is present in the fluid circuit may be driven by a pump and flow from a fluid circuit channel, through the guide fluid channel 12 of the extendable pressurized fluid coupler 2, through the piston fluid channel 13, through the valves 28, 29, through the second fluid channel 11 of the receiving pressurized fluid coupler 3, and into a second fluid circuit channel. The second fluid circuit channel may guide the fluid to drive a certain work tool or element to perform work. After the respective fluid has driven the respective work tool or element, it may be guided by a second fluid circuit channel to the second fluid channel 11, through the valves 28, 29, through the piston fluid channel 13, through the guide fluid channel 12, through the connected fluid circuit channel and along the pump again in the direction of the extendable pressurized fluid coupler 2. In another embodiment, the fluid may flow in an opposite direction. The fluid may drive a certain part either after the fluid has passed the extendable pressurized fluid coupler 2 or after the fluid has passed the receiving pressurized fluid coupler 3. Pressurized fluid may flow along the respective central axes of each channel.

In an embodiment, the central axes of the couplers 2, 3 may not be in line so that alignment may be needed to connect the couplers 2, 3. Many factors, such as for example expanding material, material deformation, wear, and/or other factors, may contribute to the difficulty of bringing couplers 2, 3 repetitively in line with each other. However, it may be advantageous to keep the central axes 6, 37 of the piston 5 and the receiving portion 35, respectively, in line, to avoid possible spilling of fluid. The receiving portion 35 may therefore be moved perpendicular to its central axis 37, i.e. in a transverse direction, so that the central axis 37 of the receiving portion 35 may deviate several millimeters or centimeters from the central axis 36 of the first portion 34, and may be brought in line with the central axis 6 of the piston 5. The tapered end 30 of the piston 5 may guide the piston 5 into the receiving opening 31 and push the receiving portion 35 in a transverse direction until the central axes 6, 37 of the piston 5 and the receiving portion 35, respectively, are aligned. In another embodiment, the central axis 32 of the receiving pressurized fluid coupler 3 and the central axis 6 of the extendable pressurized fluid coupler 2 may be approximately in line so that a coupling may be established with little or no alignment of the piston 5 and the receiving portion 35 with respect to each other.

The extendable pressurized fluid coupler 2 and the receiving pressurized fluid coupler 3 may be used separate or together as an assembly for connecting pressurized fluid circuit channels. The couplers 2, 3 may be mounted on frames. The frames may be moved with respect to each other, so that connection or disconnection of the couplers 2, 3 is needed. Multiple coupler assemblies 1 may form part of a circulating fluid circuit. When the couplers 2, 3 are connected the fluid may flow through a first coupler assembly 1 in one direction, drive a certain part, and flow back through a second coupler assembly 1 in an opposite direction. At one side of the coupler assembly 1 a pump may pressurize the fluid, while at the other side of the assembly the fluid may drive a certain element to move and/or work. In an embodiment, one of the couplers 2, 3 is mounted on a work tool, and another one of the couplers 2, 3 is mounted on a machine. Hence, the fluid circuit of the machine may be readily coupled to the circuit of the work tool, wherein the fluid circuit of the machine pressurizes the fluid through the circuit of the work tool to drive the work tool or a part thereof.

It shall be readily apparent to the skilled person that various modifications and variations can be made in each of the disclosed couplers 2, 3 without departing from the scope or spirit of the disclosure. Other embodiments of the disclosure will be apparent to those skilled in the art from consideration of the specification and practice of the disclosure disclosed herein. It is intended that the specification and examples be considered as exemplary only. Although the preferred embodiments of this disclosure have been described herein, improvements and modifications may be incorporated without departing from the scope of the following claims.

What is claimed is:

1. A receiving pressurized fluid coupler for connection with an extendable pressurized fluid coupler comprising:
   a first portion having a central axis,
   a receiving portion for receiving the extendable pressurized fluid coupler for establishing a fluid passage between the two couplers, the receiving portion having a central axis that is parallel with the central axis of the first portion, and
   a fluid channel that extends centrally through the first portion and the receiving portion, wherein
   the receiving portion is arranged to move with respect to the first portion in a direction that is perpendicular to the central axes for alignment with the extendable pressurized fluid coupler, characterized in that the first portion is provided with a bearing that is coupled to the fluid channel for allowing rotation of the first portion with respect to the fluid channel, and
   the receiving portion is provided with a bearing that is coupled to the fluid channel for allowing rotation of the receiving portion with respect to the fluid channel, so that the receiving portion is arranged to move in a direction perpendicular to its central axis for allowing alignment with respect to the extendable pressurized fluid coupler.

2. The receiving pressurized fluid coupler according to claim 1, wherein the bearings comprise spherical bearings.

3. The receiving pressurized fluid coupler according to claim 2, wherein the first portion is provided with a resilient element that is biased in a direction parallel to the central axis of the first portion.

4. The receiving pressurized fluid coupler according to claim 1, wherein the bearings comprise resilient elements.

5. The receiving pressurized fluid coupler according to claim 4, wherein the receiving portion comprises a dry break valve.

6. An assembly of the extendable pressurized fluid coupler and the receiving pressurized fluid coupler according to claim 1, the extendable pressurized fluid coupler comprising:
- a guiding portion having a central fluid channel,
- a piston having a central fluid channel,
- the guiding portion and the piston having a common central axis,
- a drive circuit for driving the piston, wherein
- the piston is extendable with respect to the guiding portion,
- the guiding portion is arranged for guiding the piston along the central axis, and
- the piston is arranged for connecting the extendable pressurized fluid coupler to the receiving pressurized fluid coupler, so that a fluid passage for a main pressurized fluid circuit is established.

7. The assembly according to claim 6, wherein an inside surface of the piston is guided along an outside surface of the guiding portion.

8. The assembly according to claim 7, wherein the main pressurized fluid circuit is arranged to drive the fluid at a speed of at least 150 liters per minute.

9. The assembly according to claim 8, wherein the piston has a tapered end for alignment with the corresponding coupler.

10. The assembly according to claim 9, wherein the drive circuit comprises a pressurized fluid circuit.

11. The assembly according to claim 10, wherein the drive circuit comprises a second pressurized fluid circuit that is separate from the main pressurized fluid circuit.

12. The assembly according to claim 11, wherein the piston comprises a dry break valve.

13. A machine for driving a work tool wherein the machine is provided with a work tool coupler for coupling the work tool to the machine and the assembly according to claim 6, to establish a fluid passage through the pressurized fluid couplers.

* * * * *